(12) United States Patent
Righi

(10) Patent No.: US 7,778,675 B1
(45) Date of Patent: Aug. 17, 2010

(54) REMOTELY ACCESSING A COMPUTING DEVICE IN A LOW-POWER STATE

(75) Inventor: Stefano Righi, Lawrenceville, GA (US)

(73) Assignee: American Megatrends, Inc., Norcross, GA (US)

( * ) Notice: Subject to any disclaimer, the term of this patent is extended or adjusted under 35 U.S.C. 154(b) by 804 days.

(21) Appl. No.: 11/332,542

(22) Filed: Jan. 13, 2006

Related U.S. Application Data

(60) Provisional application No. 60/644,362, filed on Jan. 14, 2005.

(51) Int. Cl.
*H04B 1/38* (2006.01)

(52) U.S. Cl. .................... 455/574; 455/41.2; 455/419; 714/320; 714/324

(58) Field of Classification Search ................ 713/320, 713/324; 455/419, 418, 566, 557, 574, 41.2
See application file for complete search history.

(56) References Cited

U.S. PATENT DOCUMENTS

| | | | | |
|---|---|---|---|---|
| 4,747,041 A | * | 5/1988 | Engel et al. ................ | 713/324 |
| 6,430,599 B1 | | 8/2002 | Baker et al. ................ | 709/203 |
| 6,633,759 B1 | * | 10/2003 | Kobayashi .................. | 455/419 |
| 2001/0049279 A1 | * | 12/2001 | Vermelle et al. ............ | 455/419 |
| 2002/0151327 A1 | | 10/2002 | Levitt ........................ | 455/556 |
| 2002/0165006 A1 | | 11/2002 | Haller et al. ............... | 455/556 |
| 2003/0056131 A1 | * | 3/2003 | Eberhard et al. ............ | 713/320 |
| 2003/0080996 A1 | | 5/2003 | Lavin et al. ................ | 345/738 |
| 2003/0081740 A1 | | 5/2003 | Piotrowski ............... | 379/88.18 |
| 2004/0034723 A1 | | 2/2004 | Giroti ........................ | 710/8 |
| 2004/0081129 A1 | | 4/2004 | Haller et al. ............... | 370/338 |
| 2004/0143550 A1 | | 7/2004 | Creamer et al. ............. | 705/41 |
| 2004/0204063 A1 | | 10/2004 | Van Erlach ............. | 455/556.1 |
| 2004/0243649 A1 | | 12/2004 | Husemann et al. ......... | 707/201 |
| 2004/0247023 A1 | | 12/2004 | Sasai et al. ................. | 375/220 |
| 2004/0259539 A1 | | 12/2004 | Ayatsuka ................. | 455/422.1 |

\* cited by examiner

*Primary Examiner*—Lana N Le
*Assistant Examiner*—Ping Y Hsieh
(74) *Attorney, Agent, or Firm*—Hope Baldauf Hartmann LLC

(57) ABSTRACT

Aspects provide a computer-readable medium for accessing computer applications and application data on a computer operating in a low-power state utilizing a wireless device and providing the requested information in a usable format over a short-range communications link. According to one aspect, a computer-readable medium causes a computer to receive a request for data over a short-range wireless link. If the computer is in a standby state, a low-power state is initiated, a software component is executed to receive the request, retrieve the data, format the data for display on the wireless device, and send the data to the wireless device. If the computer is in a hibernation mode, a pre-boot application is executed to retrieve, format, and send the stored data to the wireless device or to initiate a low-power or power-on state and forward the request to a software component for retrieving the requested data.

21 Claims, 6 Drawing Sheets

REMOTELY ACCESSING A COMPUTING DEVICE IN A LOW-POWER STATE

CROSS-REFERENCE TO RELATED APPLICATIONS

This application claims the benefit of provisional U.S. patent application No. 60/644,362, filed on Jan. 14, 2005, and entitled "Enabling PC Applications with a Wireless Communications Device."

TECHNICAL FIELD

The present invention relates to remote application enablement. More particularly, the present invention relates to using a wireless device and a short-range, low-power communications link to access applications and application data located on a computing device while the computing device is in a low-power state.

BACKGROUND

For many, traveling is a common and often necessary part of their personal or professional lives. For these people, and many others, technology has greatly improved their ability to stay in touch with others and to conduct business without having to be physically located in their home or office. As an example, laptop computers ("laptops") have enabled people to work while sitting in an airport or hotel room, or even while riding on an airplane. The size and portability of laptops is a convenience that allows people access to important documents, spreadsheets, presentations, schedules, electronic mail ("email"), and contact information essentially anywhere that a laptop may be carried.

However, laptops also have certain limitations. Laptops consume power that is provided by either a power cord plugged into a power source or a battery. When a power source is not available, which is often the case on an airplane for example, the applications and data are only available to the user for a limited period of time defined by the size of the battery used. Additionally, while laptops offer people convenient access to applications and application data while traveling, laptops can be cumbersome when quick access to data is all that is required. For example, if a businessman is at an airport and needs quick access to a spreadsheet or an email located on the laptop, he typically has to open a carrying case, remove the laptop, open the display, turn the power on, wait for the laptop operating system to boot, open the desired application, access the desired data, close the application, initiate shut down, wait for the computer to turn off, close the display, return the laptop to the carrying case, and close the case. This can be a time-consuming and burdensome process for someone that is in a crowded location or is in a hurry.

Several devices are available that allow a person access to information on a laptop without the necessity of following the entire burdensome procedure outlined above. First, there are cellular telephones and other portable devices that allow a user access to email, calendar information, and other applications on the laptop using the portable device. Additionally, synchronizing software allows a user to upload user-selected data to the portable device. After synchronization, the user is able to access data that is up-to-date as of the time that the personal device was synchronized. However, any emails or other information received or updated on the computer after the synchronization will not be accessible to the user. These solutions using short-range communication links such as BLUETOOTH require that the computer remain in a powered-on state, something that is not often convenient for the reasons discussed above.

An additional problem associated with many wireless computing devices is that the devices often cannot handle demanding computing tasks such as displaying complex web pages. Cellular telephones, for example, have very small screens that require information on complex web pages, spreadsheets, or other documents to be displayed in a format that is useful to the user. Doing so requires processing that a cellular telephone may not be able to efficiently accomplish in order to provide the user with rapid retrieval and display of the requested information. Moreover, there are wireless devices that provide real-time email and data but do so over a public network, presenting security concerns and often requiring costly service agreements.

It is with respect to these considerations and others that the various embodiments of the invention have been made.

SUMMARY

Aspects of the present invention address these problems and others by providing a computer-readable medium for accessing computer applications and application data on a computer operating in a low-power state utilizing a wireless device and providing the wireless device with the requested information in a usable format over a short-range communications link.

According to one aspect of the invention, a computer-readable medium is provided for causing a computer to establish a short-range wireless communications link with a wireless device. The computer receives a request from the wireless device for application data. If the computer is in a standby state, the request initiates a low-power state from the standby state and a software component is then executed. The software component provides a first interface for communicating with an application and application data storage device and a second interface for communicating with a wireless device. After receiving the request for application data at the second interface, the software component translates the request to a format necessary to retrieve the requested data through the first interface, retrieves the data through the first interface, formats the data for display on the wireless device, and sends the data to the wireless device through the second interface.

In accordance with still other aspects of the present invention, if the computer is in a hibernation state, the request initiates a low-power state and a pre-boot application is executed. The pre-boot application extracts data stored in a location accessible to the pre-boot application, formats the data for display on the wireless device, and sends the data to the wireless device. Alternatively, according to a further aspect of the invention, if the computer is in a hibernation state, a pre-boot application is executed. The pre-boot application receives a request from the wireless device for application data stored by the computing device, initiates a low-power state or full power-on state in response to receiving the request for data, and sends the request to a software component. The software component receives the request for application data at a second software component interface for communicating with the wireless device, translates the request to a format necessary to retrieve the requested data through a first software component interface for communicating with an application and application data storage device, retrieves the data through the first software component interface, formats the data for display on the wireless device, and sends the data to the wireless device through the second software component interface.

In yet another aspect of the present invention, a request from the wireless device for application data is a request for a specified portion of a file. The requested portion is extracted from an application data file, formatted for display on the wireless device, and sent to the wireless device for display.

The invention may be implemented as a computer process, a computing system or as an article of manufacture such as a computer program product or computer-readable medium. The computer-readable medium may be a computer storage medium readable by a computer system and encoding a computer program of instructions for executing a computer process. The computer-readable medium may also be a propagated signal on a carrier readable by a computing system and encoding a computer program of instructions for executing a computer process.

These and various other features as well as advantages, which characterize the present invention, will be apparent from a reading of the following detailed description and a review of the associated drawings.

DETAILED DESCRIPTION

Figure 1:
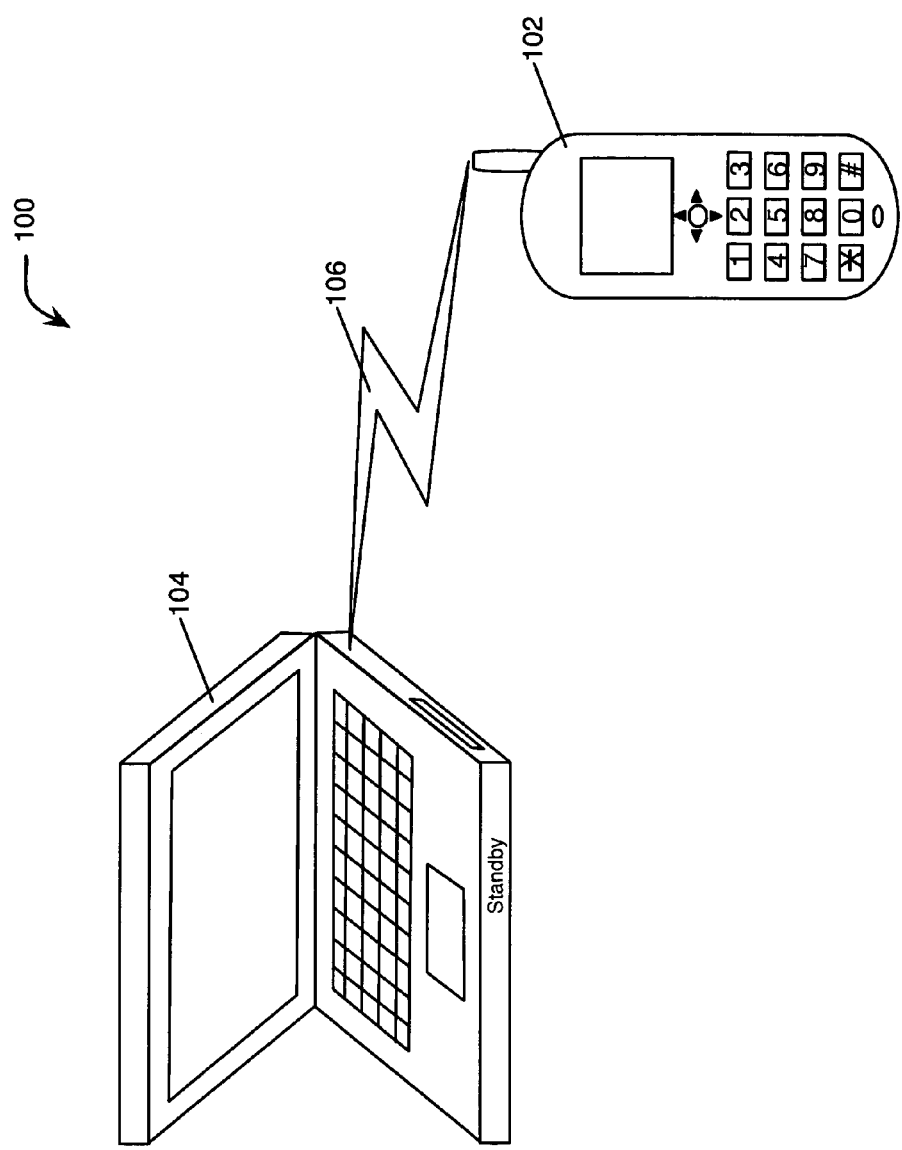
FIG. 1 is a block diagram illustrating the connection of a wireless device with a computer over a private network according to various embodiments of the invention.

Embodiments of the present invention provide computer-readable media for accessing application data on a computing device operating in a low-power state utilizing a wireless device and providing the wireless device with the requested information in a usable format over a short-range communications link. In the following detailed description, references are made to the accompanying drawings that form a part hereof, and in which are shown by way of illustration specific embodiments or examples. Referring now to the drawings, in which like numerals represent like elements through the several figures, aspects of the present invention and the exemplary operating environment will be described.

Local computers may be managed remotely through embodiments of the present invention so that the system manager or other user need not be physically present with the local computer but instead views screen displays and interacts with the local computer through a remotely located computer. For example, the user can remotely view screen frames being produced by the local computer to determine whether the local computer has crashed or whether the local computer is executing a particular application. Additionally, the end user may operate a user input device of the remote computer such as a mouse or keyboard, and the user input is transferred to the local computer where it can be implemented.

FIG. 1 illustrates one embodiment of the present invention. In this embodiment, data access system 100 includes a mobile telephone 102 and a laptop computer 104. Application data located within a laptop computer 104 may be accessed by and displayed on a mobile telephone 102. While device 102 is described throughout the embodiments as being a mobile or cellular telephone, it should be understood that device 102 may be any wireless communications device having low power, short-range communications capability and a display. Other examples include a personal data assistant, a pager, a wristwatch, a hand-held game console, or another computer. It should also be understood that the application data located on the computer 104 that is accessible to the mobile device 102 may include electronic mail, contact information, calendar information, word processing documents, spreadsheets, financial application data, rich media, images, or any other data, including portions or combinations of data, that would be accessible to a user of the computer 104. The embodiment illustrated in FIG. 1 includes a laptop computer 104 operating in a standby or hibernation state. Although laptop computer 104 is shown in FIG. 1 with the display screen in an open position, it should be appreciated that a laptop computer may be in a standby or hibernation state with the display screen closed, allowing for data access while the computer is located within a carrying case.

In this context, "standby" comprises any power conservation state in which the computer is idle but remains available for immediate use. The applications on the computer may be frozen and the screen powered down, but the operating system remains loaded. Data that resides in memory when the computer is placed in a standby state is not saved to the hard disk. This contrasts with a "hibernation" or powered-down state. In a hibernation state, the computer shuts down after saving everything in memory to the hard disk. When powered back on, the programs and documents that were open are restored to the desktop. The components of the laptop computer 104 will be described in detail below with respect to FIG. 3. Similarly, the components of the mobile telephone 102 will be described below with respect to FIG. 4.

Generally, to access information from an application on the laptop computer 104 using the mobile telephone 102, a request is made from the mobile telephone to the laptop computer that is in a standby state over a low power, short-range communications link 106 that is established between the computer 104 and the mobile telephone 102. This communications link 106 provides a private point-to-point network that allows for data transfer over a network that is generally more secure than a public network such as the Internet. Once the link is established, the computer 104 initiates a low-power state for retrieving requested data. A low-power state is a working state in which the operating system of the computer 104 is booted and operational, but one or more non-essential computer components are powered down, typically for power management purposes. For example, the display of the computer 104 may remain powered down while the computer 104 is operational. Other examples include but are not limited to various applications as well as the hard drive. The mobile telephone 102 may receive data from any application on the laptop computer 104 in a user-friendly format to be displayed on the telephone display. The communication, data retrieval, and formatting is accomplished via an application program plug-in associated with the application for which data is requested. The plug-in responds to smart requests by retrieving and transmitting only the requested portion of data from an application data file. This operation will be described in detail below with respect to FIG. 5A.

Alternatively, the computer 104 may be placed in a hibernation state. If the computer is in a hibernation state, then a pre-boot application within the Basic Input/Output System ("BIOS") operates to retrieve and transmit information that has been stored on the computer's hard disk, or "offline" information. As an example of this situation, a user would have access to his stored email, but could not access email in "real-time" as it is received while in hibernation. The pre-boot application performs the communication, data retrieval, and formatting necessary for providing the requested data to the mobile telephone 102. The pre-boot application may also operate to resume operation to a low-power state or a full power-on state for retrieving real-time information. In this embodiment, the request for information may be passed to the appropriate application program plug-in upon activation of the low-power state or power-on state. These embodiments will be further described below with respect to FIGS. 5A-5B.

Figure 2:
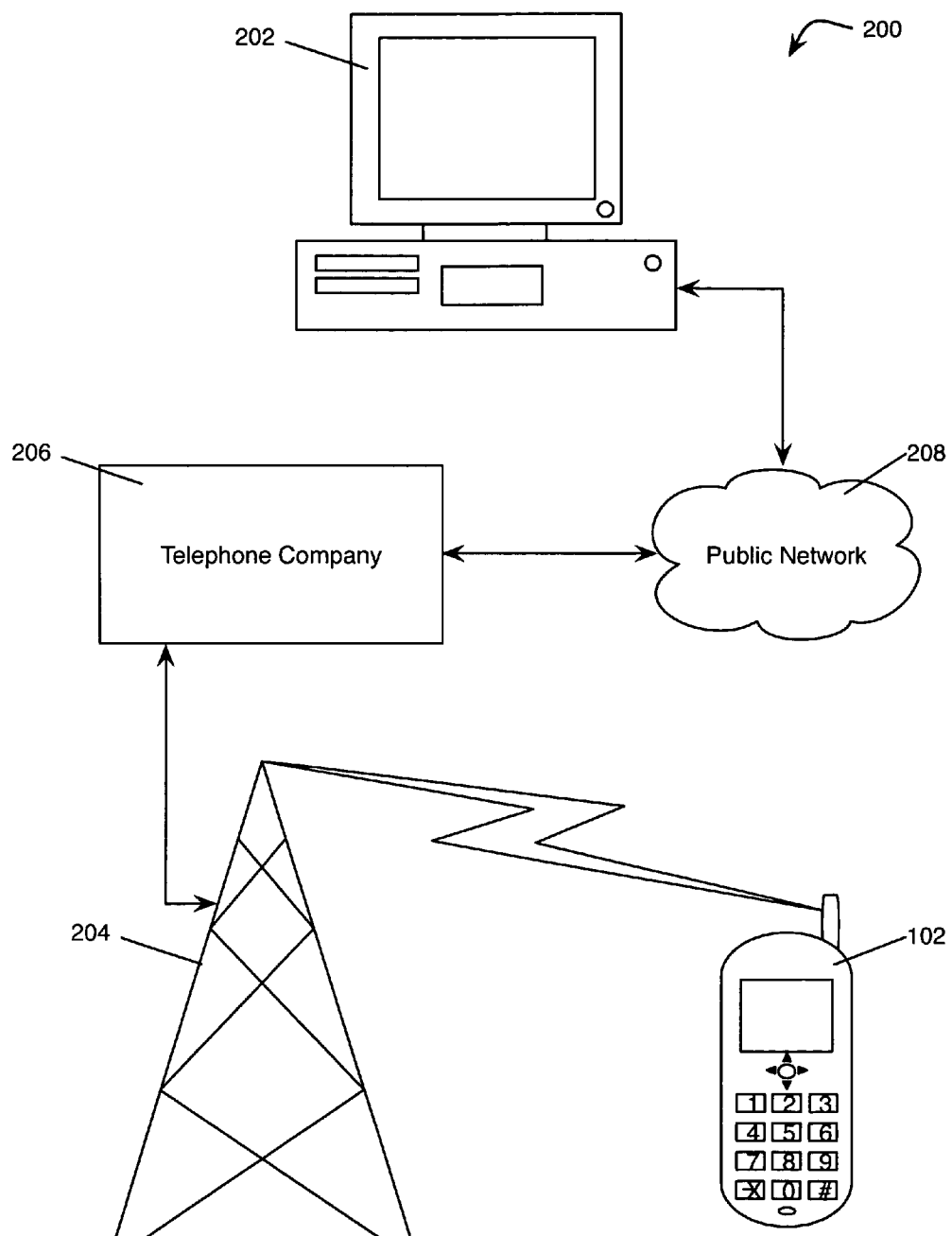
FIG. 2 is a block diagram illustrating the connection of a wireless device with a computer over a public network according to various embodiments of the invention.

FIG. 2 illustrates a further embodiment of the present invention. According to this embodiment, data access system 200 includes a mobile telephone 102 and a personal computer 202. Information from personal computer 202 may be accessed by a mobile telephone 102 over a public network 208, such as the Internet. The personal computer 202 may be a desktop computer, a laptop computer, or any other computing device capable of executing applications and communicating over a public network. A user would connect to a personal computer 202 by calling an IP address associated with the computer 202. A communication from mobile telephone 102 to computer 202 travels wirelessly to base station 204. Base station 204 transmits the communication to telecommunications center 206, where it is transmitted to computer 202 via a public network 208. The telecommunications center 206 may be any physical telecommunications components as known in the art capable of receiving a communication from a base station 204 and transmitting the communication to its intended destination via a public network 208. The personal computer 202 may be in a normal operating state, low-power state, or may be in a standby or hibernation state when the communication is received from the mobile telephone 102. The request receipt, data retrieval, data formatting, and data transmission is performed by an appropriate application program plug-in or pre-boot application identical to that of data access system 100 and as described below.

Figure 3:
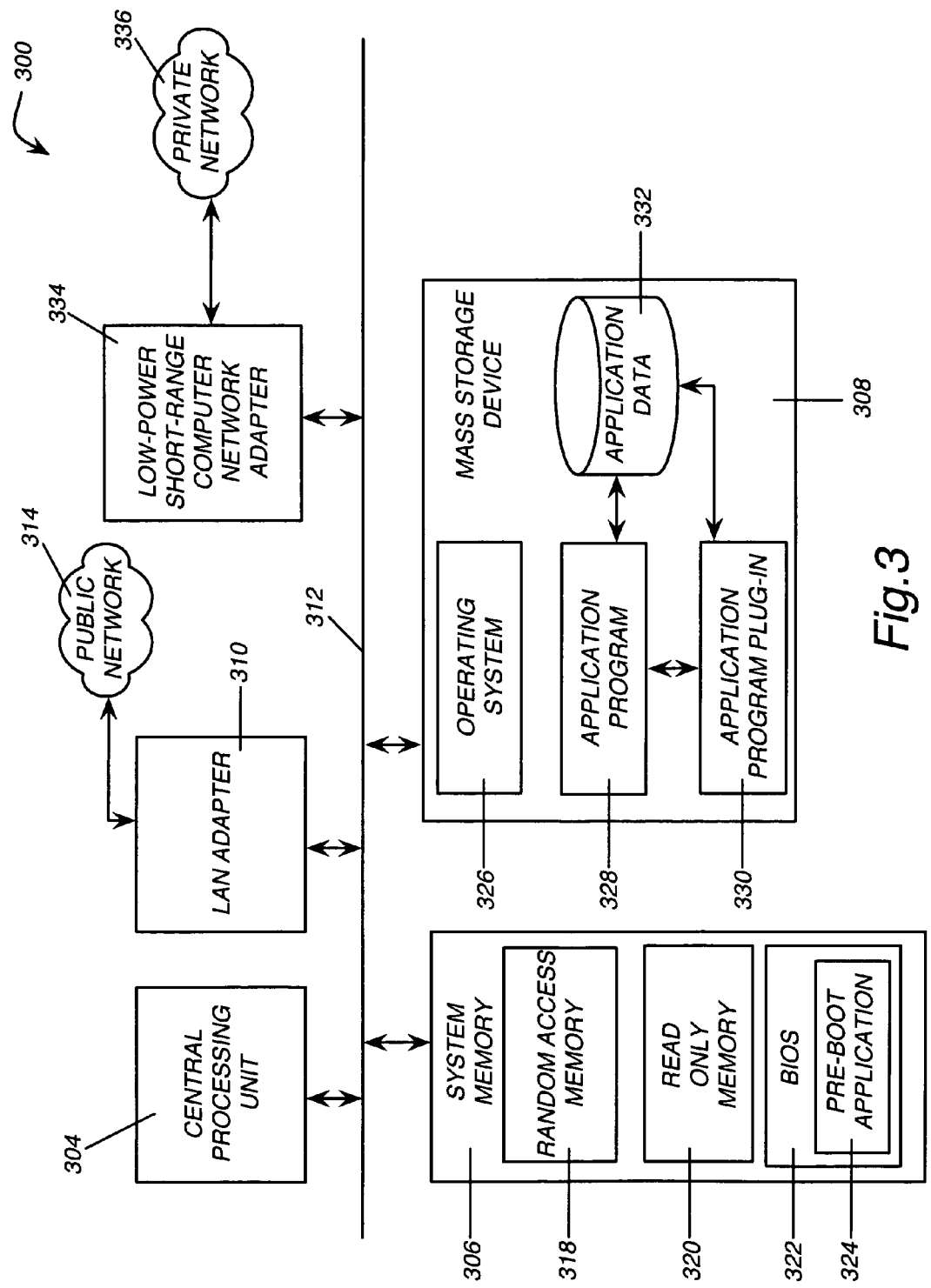
FIG. 3 is a computer architecture diagram showing aspects of a computer architecture utilized in the various embodiments of the invention.

Referring now to FIG. 3, a computer system 300 according to the present invention will be described. Computer system 300 includes not only laptop computer 104 and personal computer 202, but also includes hand-held computers, embedded computer systems, personal digital assistants, and other types of computing devices known to those skilled in the art. The components of computer system 300 are connected to one another via one or more buses 312. It is also contemplated that computer system 300 may not include all of the components shown in FIG. 3, may include other components that are not explicitly shown in FIG. 3, or may utilize an architecture completely different than that shown in FIG. 3.

Computer system 300 has a central processing unit ("CPU") 304. The CPU 304 is a standard central processor that performs arithmetic and logical operations necessary for the operation of the computer. In addition, computer system 300 has system memory 306 and mass storage device 308. System memory 308 comprises random access memory ("RAM") 318, read only memory ("ROM") 320, and BIOS 322. As is known to those skilled in the art, BIOS 322 includes program code containing the basic routines that help to start up the computer 300 and to transfer information between elements within the computer 300.

The mass storage device and its associated computer-readable media, provide non-volatile storage for the computer 300. Although the description of computer-readable media contained herein refers to a mass storage device, such as a hard disk or CD-ROM drive, it should be appreciated by those skilled in the art that computer-readable media can be any available media that can be accessed by the computer 300. By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

The mass storage device comprises operating system 326, at least one application program 328, and application data 332. As known to those skilled in the art, an operating system 326 comprises a set of programs that control operations of a computer and allocation of resources. An application program 328 is software that runs on top of the operating system software and uses computer resources made available through the operating system to perform application specific tasks desired by the user.

Computer system 300 has a local area network ("LAN") adapter 310 for connecting the computer system to a public network 314, such as the Internet. Computer system 300 additionally comprises a low power, short-range network adapter 334. The low power, short-range network adapter 334 is used to establish short-range point-to-point communications over a private network 336. While the preferred method utilizes BLUETOOTH technology, other point-to-point technologies may be used including universal serial bus ("USB") and infrared ("IR") data association. An application program plug-in 330 is used to receive and respond to requests for information from a cell phone application. The plug-in 330 communicates with the associated application program 328 and the data 332 stored by the application itself.

An application program plug-in is software that executes within a program to modify the program in a desired manner. A plug-in 330 is installed on computer 104 for each application 328 for which a user would like the capability to access data from a wireless device while the computer is in a low-power state. Each plug-in 330 is capable of exporting application data 332 to storage external to the program, but internal to the computer 104. For example, a MICROSOFT OUTLOOK plug-in has the capability to export data such as tasks, calendar events, emails, contacts, and notes to an external repository that is external to OUTLOOK but within computer 104. The plug-in is configured to store this data at designated intervals into the external repository. The plug-in may be configured to save the information when the program is closed, at the end of each week, or any other desired interval.

Plug-in 330 may also be configured to access the requested information directly from the application upon receiving the request. In this "online state," the computer 104 is initially in a standby state in which the operating system and applications are loaded in memory, but are in a non-active state. Upon receipt of the data request from the mobile telephone 102, the computer 104 moves from the standby state to a low-power state in order to send the request directly to the appropriate plug-in, which then accesses the up-to-date information. For example, a request for emails might be received at a plug-in that is executing in MICROSOFT OUTLOOK. Because the computer 104 exits from a standby state to a low-power state upon receipt of the request, the plug-in has the capability of accessing the network through MICROSOFT OUTLOOK to receive current emails.

Each application program plug-in 330 is configured to export all or portions of data designated by a user in order to allow for responses to "smart requests" from mobile telephone 102. A smart request is a request for a specific portion of data, rather than an entire data file. For example, a user may request only the summary data for a spreadsheet or the balance of an account in an accounting program, rather than the entire spreadsheet or account file. In this manner, embodiments of the present invention minimize the amount of data required to be transmitted to the mobile telephone, saving bandwidth and time and providing meaningful data that may be more easily displayed and managed on the smaller display of the telephone. A plug-in 330 may be configured to export the designated data portions in real time upon receipt of a request from the mobile telephone 102, or to save the data portions in a designated location for access by a pre-boot application 324 when a smart request is received while the computer 104 is in a hibernation state as described below.

A pre-boot application 324 is utilized to access data on the computer 104 when the computer is in a hibernation state. When the pre-boot application 324 receives a request from a wireless communications device for application data 332, the pre-boot application may either access and transmit stored data in response, or initiate a low-power or fully powered-on state to access real-time information via the application program 330. Pre-boot application 324 is a software module that operates in the pre-boot environment of the computer 104. When the computer 104 is in a hibernation state, then the computer is said to be in an "offline state." When a request for data is received while the computer 104 is in the offline state, the operating system is not booted, rather the pre-boot application 324 capable of retrieving the requested data from a specific storage location to which data has been stored is launched in the pre-boot environment. This specific storage location may be the repository discussed above that is external to an application, but internal to the computer 104. In this manner, data may be retrieved while the computer 104 operates in the pre-boot environment, without executing the associated application.

Alternatively, the pre-boot application 324 may initiate a typical boot sequence to bring the computer 104 to a low-power state or a full-power operational state and then pass the data request to the plug-in 330 for retrieval of the online information. The pre-boot application 324 and application program plug-in 330 are configured to format retrieved data for display in a manner that is appropriate for the reduced screen size of mobile telephone 102. Because a large amount of data with a large quantity of text or graphics becomes virtually useless to a user when attempting to view the data on a small display screen, the pre-boot application 324 and plug-in 330 translates and formats the data according to the form factor of the associated display screen. As an example, this may include organizing data into small screen menus with selectable buttons for drilling down into subsets of information or stripping the data of graphics and extraneous information. It should be understood that while it is preferable to perform this formatting operation within the computer 104 prior to transmitting the data to the mobile telephone 102 due to decreasing the required transmission bandwidth, this formatting operation may be performed by the application program 412 (described below with respect to FIG. 4) within the mobile telephone 102.

Figure 4:
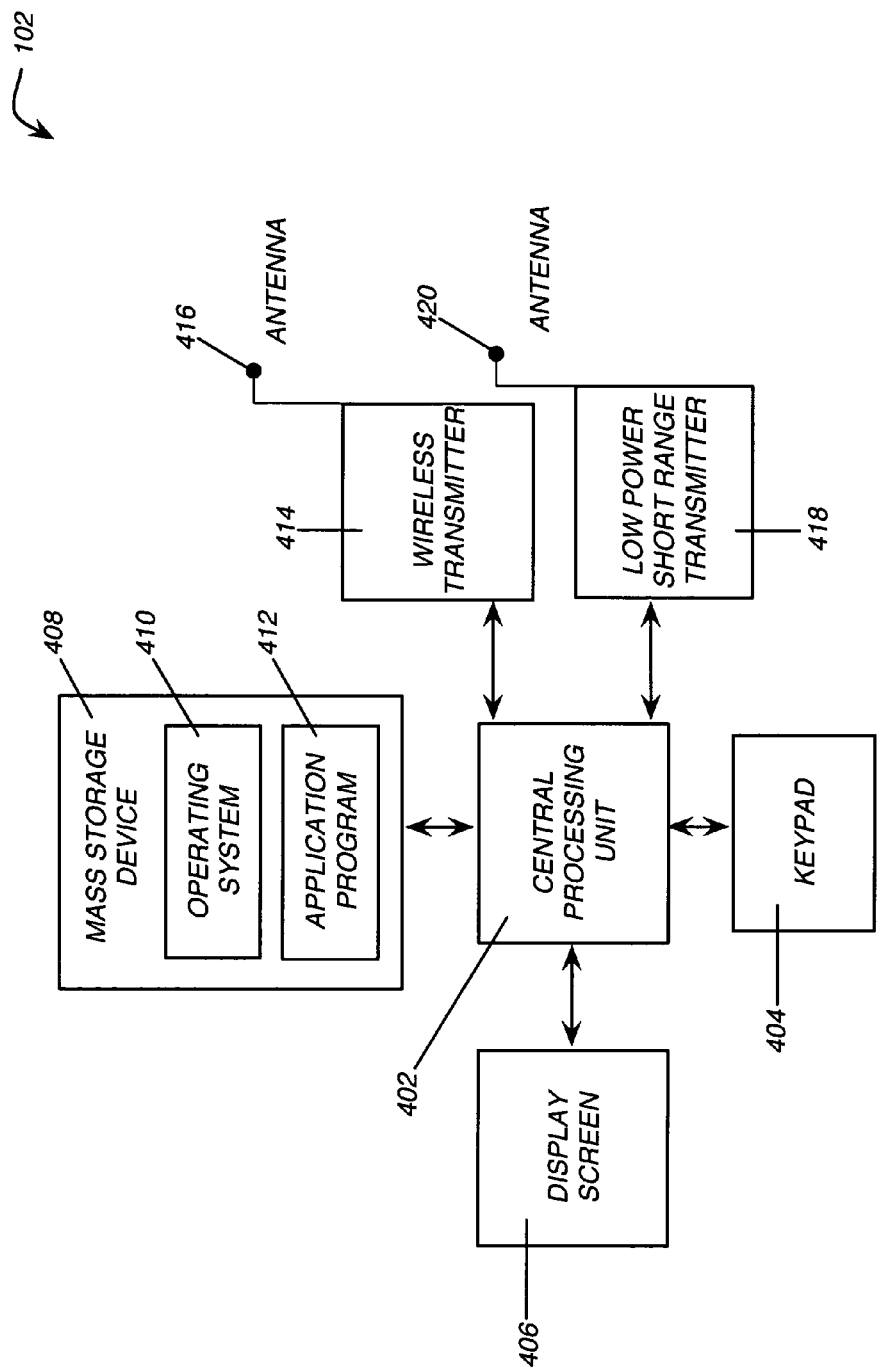
FIG. 4 is a wireless device architecture diagram showing aspects of a wireless device architecture utilized in the various embodiments of the invention.

Referring to FIG. 4, the components of a mobile telephone 102 according to the present invention will be described. As known to those skilled in the art, a typical mobile telephone includes a CPU 402, display screen 406, keypad 404, wireless transmitter 414, antenna 416, and mass storage device 408. Mass storage device 408 and its associated computer-readable media provide non-volatile storage for the mobile telephone 102. Also as known in the art, the operating system 410 comprises a set of programs that control operations of mobile telephone 102 and allocation of resources. An application program 412 is software that runs on top of the operating system software and uses computer resources made available through the operating system to perform application specific tasks desired by the user. The application program 412 provides a user interface, sends user requests for application information to a computer via a low power, short-range transmitter 418 and antenna 420, receives responses from the computer via the antenna 420, and converts the information to a usable format for display on the mobile telephone 102.

Application program 412 would preferably be a J2ME based application to take advantage of operability across various mobile telephone models supported by various manufacturers. It is contemplated that application program 412 may be customized by manufacturer if desired. Application 412, when executed, creates and displays a user interface with any number of desired options for accessing data on a remote computer. For example, there may be buttons for synching email, requesting a document, or accessing a calendar. The user interface allows for "smart requests" as described above wherein a specific portion of a data file is requested rather than the entire data file. It should be appreciated that the application program may allow a user to request a specific data file, after which the application program plug-in 330 or pre-boot application 324 responds with a pre-designated portion of the requested data file, effectively translating the generic request into a smart request. In this manner, application programs may be made simple and generic across telephone platforms, with the customization of the requests occurring within the computer 104 at the application program plug-in 330 and pre-boot application 324.

As an alternative to application program 412, a mobile telephone 102 may have a WAP browser or even a full-feature browser that may be used to access information on a computer. Using a browser is less desirable due to the limitations inherent with browsers. For example, WAP simply provides a browsing window without allowing interaction with other applications on the mobile telephone. Therefore, using a WAP browser, a person could not merge the contact information on a mobile telephone 102 with the contact information on a computer 104. Additionally, a browser requires more bandwidth for communication between a mobile telephone 102 and a computer 104 than would be required with a more complex application.

Figure 5A:
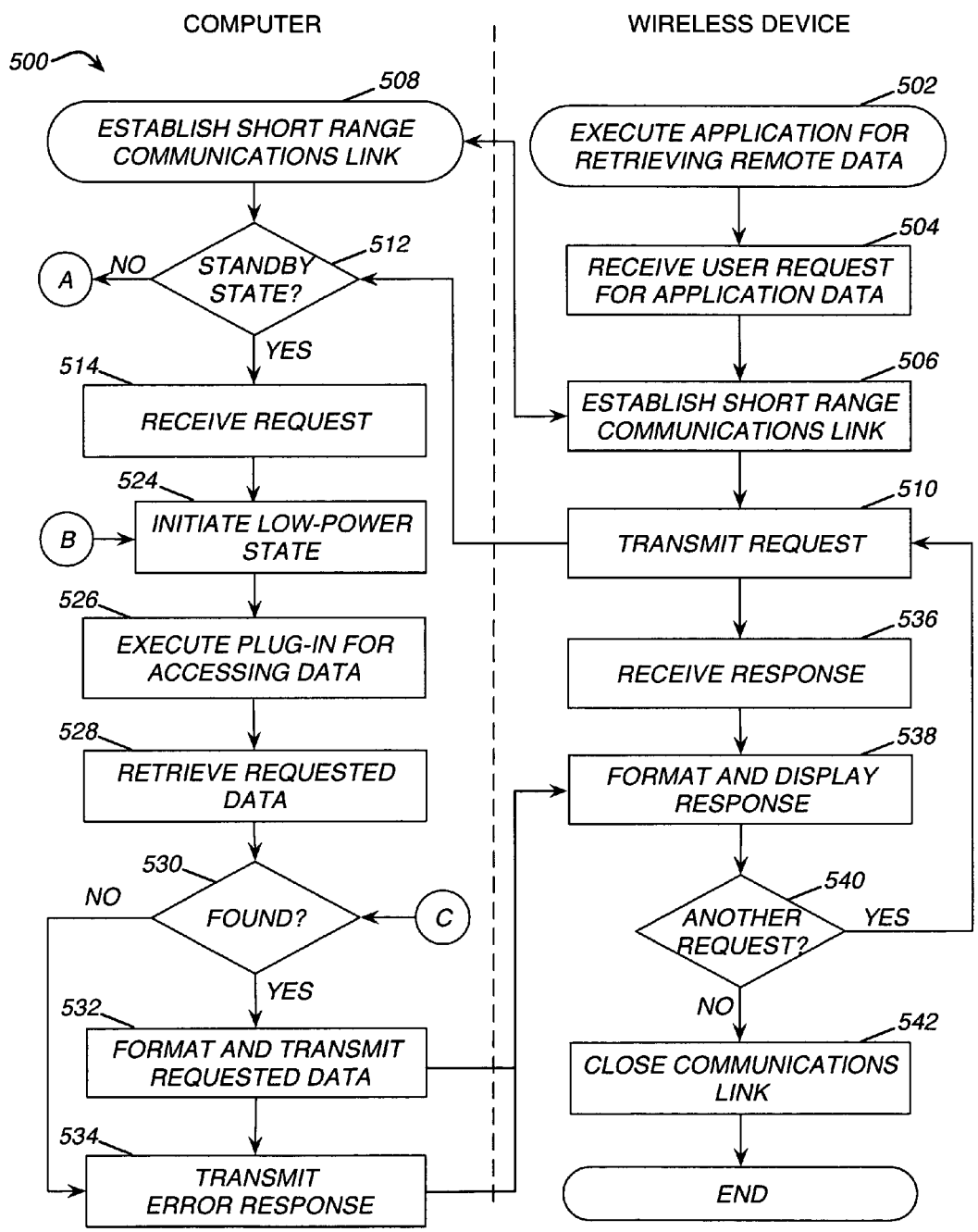
FIGS. 5A-5B are flow diagrams illustrating methods provided by the embodiments of the invention for remotely accessing data on a computing device while the computing device is in a low-power state.
Figure 5B:
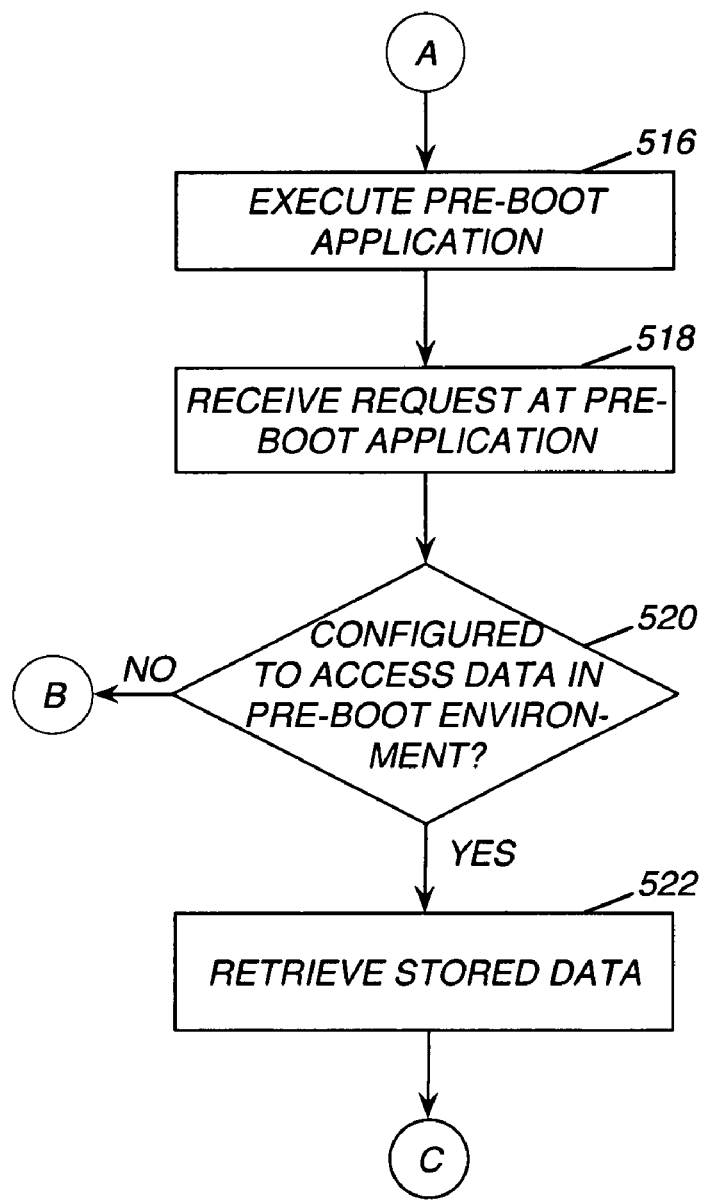

Turning now to FIG. 5, additional details regarding the operation of the computer 104 and mobile telephone 102 for remotely accessing information on computer 104 while the computer is in a low-power state will be discussed. It should be appreciated that the logical operations of the various embodiments of the present invention are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations of FIGS. 5A-5B and making up the embodiments of the present invention described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims attached hereto.

The left side of FIG. 5A, left of the dotted line, describes from the perspective of a computer 104, operations for accessing application data 332 on the computer 104 using a wireless communications device such as a mobile telephone 102. The right side of the FIG. 5A, right of the dotted line, describes the same operations from the perspective of the mobile telephone 102. The routine 500 begins at operation 502. At operation 502, the mobile telephone 102 executes an application 412 for retrieving remote data 332 from the computer 104. At operation 504, a user request is received by the mobile telephone 102 for application data located on computer 104. This request is input by a user through a user interface generated by application 412.

A short-range communications link is established between computer 104 and mobile telephone 102 at operations 506 and 508. As discussed above, this communications link may be via BLUETOOTH, USB, IR, or any other private, point-to-point network. The request for application data is transmitted to computer 104 at operation 510. It should be appreciated that authentication may occur when the communications link is established between computer 104 and mobile telephone 102 or prior to responding to the request. Authentication may include requiring the user to input a user name and password at the mobile telephone 102 or any other authentication procedures known in the art. At operation 512, a determination is made as to whether the computer 104 is in standby state. As described above, standby state comprises any power conservation state in which the computer is idle but remains available for immediate use. If the computer 104 is in standby state, the routine continues to operation 514. If the computer 104 is not in standby state, the routine proceeds to operation 516 in FIG. 5B, which will be discussed below.

At operation 514, the computer 104 receives the request from the mobile telephone 102 at an interface of an application program plug-in 330. At operation 524, the computer 104 enters a low-power state for processing the request. It should be understood that a low-power state may be any working state in which the operating system of the computer 104 is booted and operational, but one or more non-essential computer components are powered down. Alternatively, the computer may enter a full power-on state for processing the request. At operation 526, the computer 104 executes the application program plug-in 330 to provide access to the requested data through a separate interface of plug-in 330. At operation 528, the computer 104 retrieves the requested application data 332. If a determination is made at operation 530 that the requested data 332 was found, then the computer 104 formats and transmits the requested data 332 to the mobile telephone 102 at operation 532. If a determination is made at operation 530 that the requested data 332 was not found, then the computer 104 transmits an error response to mobile telephone 102 at operation 534. The mobile telephone 102 receives the response from the computer 104 at operation 536.

At operation 538, the response is formatted for display on the mobile telephone 102 and displayed. Formatting is typically performed by the application program plug-in 330 prior to transmitting the requested data back to the mobile telephone 102 at operation 532, however, additional formatting may be required by the application program 412 at the mobile telephone. It should be understood by those with skill in the art that all formatting may occur at the application program 412 within the mobile telephone 102, but in doing so, more bandwidth may be required for transmitting the unformatted data from the computer 104 to the mobile telephone 102. At operation 540, a determination is made as to whether another request for application data has been made by the user. If not, then the communications link is closed at operation 542 and the routine ends. If so, the routine returns to operation 510 where the new request is transmitted to the computer 104 and the routine continues as described above.

Returning now to operation 512, if a determination is made that the computer 104 is not in standby state, the routine proceeds to operation 516 in FIG. 5B. At operation 516, the computer 104 executes pre-boot application 324. The request for application data 332 is received at an interface of the pre-boot application at operation 518. At operation 520, if it is determined that the pre-boot application 324 is configured to access data while the computer 104 is in a pre-boot environment, then the routine continues to operation 522 and the stored data is retrieved through a separate interface of pre-boot application 324. With this embodiment, the user is able to retrieve stored information, although not real-time information, while the operating system of the computer remains in a hibernation or powered-off state.

The routine continues to operation 530 where it is determined whether or not the requested data was located and then the routine continues as described above. At operation 520, if it is determined that the pre-boot application is not configured to access data while the computer 104 is in a pre-boot environment, then the routine continues to operation 524. At operation 524, the pre-boot application 324 initiates a low-power state in the computer. Alternatively, the computer may initiate a full power-on state. The routine returns to operation 526 where the plug-in 330 for accessing the requested data is executed and the routine continues as described above.

In the alternative embodiment of the present invention shown in FIG. 2, application data is retrieved remotely on a wireless communications device over a public network such as the Internet rather than a private point-to-point network. An example of such a scenario would be a user using a WAP browser on his mobile telephone to connect to his personal computer at work over the Internet to retrieve data stored by an application on the work computer. With this embodiment, the routine 500 shown in FIGS. 5A and 5B remains the same with the exception of the communications link that is established in operations 506 and 508. Utilizing a public network, the communications link that is established is a long-range link rather than a short-range, point-to-point network. Utilizing a public network introduces additional security concerns requiring additional security measures known in the art.

It will be appreciated that embodiments of the present invention provide computer-readable media for accessing application data on a computing device operating in a low-power state utilizing a wireless device and providing the wireless device with the requested information in a usable format over a short-range communications link. Although the invention has been described in language specific to computer readable media, it is to be understood that the invention defined in the appended claims is not necessarily limited to the specific media described. Therefore, the specific media are disclosed as exemplary embodiments implementing the claimed invention.

The various embodiments described above are provided by way of illustration only and should not be construed to limit the invention. Those skilled in the art will readily recognize various modifications and changes that may be made to the present invention without following the example embodiments and applications illustrated and described herein, and without departing from the true spirit and scope of the present invention, which is set forth in the following claims.

I claim:

1. A computer-readable medium having stored thereon computer-executable instructions which, when executed by a computer, cause the computer to:
    establish a short-range wireless communications link with a wireless device;
    receive a request from the wireless device for application data located on the computing device;
    determine whether the computing device is in a hibernation state or in a standby state;
    if the computing device is in a hibernation state, execute a pre-boot application within a Basic Input/Output System (BIOS) of the computing device without causing the computing device to exit the hibernation state, the pre-boot application configured to receive a data request from the wireless device while the computing device is in the hibernation state, retrieve the data from a location accessible to the pre-boot application while the computer is operating in the pre-boot environment, format the data for display on the wireless device, and send the data to the wireless device;
    if the computing device is in a standby state, initiate a low-power state, execute a software component operative to provide a first interface for communicating with an application and an application data storage device and a second interface for communicating with a wireless device, and
    wherein the software component is operative to receive a request at the second interface for data stored by the application, translate the request to a format necessary to retrieve the requested data through the first interface, retrieve the data through the first interface, format the data for display on the wireless device, and send the data to the wireless device through the second interface.

2. The computer-readable medium of claim 1, wherein establishing the short-range communications link comprises:
    receiving a low power, short-range radio signal comprising an identification of the wireless device;
    authenticating the signal at the computing device as being from an allowed wireless device; and
    transmitting a response signal identifying the computing device.

3. The computer-readable medium of claim 1, wherein the computing device comprises a laptop computer.

4. The computer-readable medium of claim 1, wherein the short-range communications link comprises a BLUETOOTH communications link.

5. The computer-readable medium of claim 1, further comprising computer-executable instructions stored thereon which, when executed by a computer, cause the computer to:
    execute the software component;
    wherein execute a pre-boot application operative to receive a data request from the wireless device comprises initiate an operating system boot sequence in response to receiving the request for data, and send the request to the software component.

6. The computer-readable medium of claim 1, wherein the application data comprises at least one of electronic mail, contact information, and calendar information.

7. The computer-readable medium of claim 1, wherein the request from the wireless device for application data located on the computing device is a request for a specified portion of a file and wherein the software component is further operative to extract the requested portion from the file, format the extracted portion for display on the wireless device, and send the extracted portion to the wireless device through the second interface.

8. A computer-readable medium having stored thereon computer-executable instructions which, when executed by a computing device, cause the computing device to:
    receive a request from a wireless device over a short-range wireless communications link for application data located on the computing device;
    determine whether the computing device is in a hibernation state or in a standby state;
    if the computing device is in the hibernation state, execute a pre-boot application within a Basic Input/Output System (BIOS) of the computing device without causing the computing device to exit the hibernation state, wherein the pre-boot application is operative to receive the request at a second interface for the requested application data and execute means for retrieving the requested data through a first interface, retrieve the requested application data via the first interface, format the application data for display on the wireless device, and send the data to the wireless device via the second interface; and
    if the computing device is in a standby state, initiate a low-power state, execute a software component operative to provide a first interface for communicating with an application and an application data storage device and a second interface for communicating with a wireless device, and wherein the software component is operative to receive a request at the second interface for data stored by the application, translate the request to a format necessary to retrieve the requested data through the first interface, retrieve the data through the first interface, format the data for display on the wireless device, and send the data to the wireless device through the second interface.

9. The computer-readable medium of claim 8, further comprising computer-executable instructions stored thereon which, when executed by a computer, cause the computer to:
    export application data to a repository that is accessible to the pre-boot application while the computer is in the hibernation state according to user-defined parameters such that the requested application data is retrieved from the repository.

10. The computer-readable medium of claim 9, wherein the user-defined parameters comprise computer-executable instructions which, when executed by the computer, cause the computer to export a specified portion of a file to the repository according to a selected time interval.

11. The computer-readable medium of claim 10, wherein executing means for retrieving the requested data comprises extracting the requested portion of a file from the repository, formatting the portion for display on the wireless device, and sending the portion of the file to the wireless device.

12. The computer-readable medium of claim 8, wherein executing means for retrieving the requested data comprises sending the request to a software component, wherein the software component is operative to receive the request for data stored by the application at a second software component interface for communicating with the wireless device, translate the request to a format necessary to retrieve the requested data through a first software component interface, retrieve the data through the first software component interface for communicating with an application and application data storage device, format the data for display on the wireless device, and send the data to the wireless device through the second software component interface.

13. The computer-readable medium of claim 12, wherein the request from the wireless device for the application data located on the computing device comprises a request for a specified portion of a file, and wherein retrieving the data through the first software component interface for communicating with the application and application data storage device comprises extracting the requested portion from the file through the first software component interface.

14. The computer-readable medium of claim 8, wherein causing the computing device to format the application data for display on the wireless device comprises causing the computing device to extract only a requested portion of data from an application data file and configure the data for display according to display characteristics of the wireless device.

15. A computer-readable medium having stored thereon computer-executable instructions which, when executed by a computing device, cause the computing device to:
- establish a communications link with the wireless device;
- receive a request from the wireless device for application data located on the computing device, wherein the request from the wireless device for application data located on the computing device comprises a request for a specified portion of a file;
- determine whether the computing device is in a standby state or a hibernation state;
- if the computing device is in the standby state, initiate a low-power state and execute a software component operative to provide a first interface for communicating with an application and application data storage device and a second interface for communicating with the wireless device, wherein the software component is operative to receive the request for the specified portion of the application data file at the second interface, interface with an application associated with the application data file to search for the requested portion of the application data file, extract the requested portion of the application data file from the application data file through the first interface, format the extracted data for display on the wireless device, and send the data to the wireless device through the second interface; and
- if the computing device is in the hibernation state, execute a pre-boot application within a Basic Input/Output System (BIOS) of the computing device without causing the computing device to exit the hibernation state, the pre-boot application configured to receive a request from the wireless device for application data stored by the computing device, to retrieve the application data from a repository without causing the computing device to exit the hibernation state, and to respond to the request from the wireless device with the application data without causing the computing device to exit the hibernation state.

16. The computer-readable medium of claim 15, further comprising computer-executable instructions stored thereon which, when executed by a computer, cause the computer to export the specified portion of the application data file to the repository according to a selected time interval.

17. The computer-readable medium of claim 15, wherein the data sent to the wireless device from the software component is formatted according to the available bandwidth of the communications link between the computing device and the wireless device.

18. The computer-readable medium of claim 15, wherein formatting the extracted data for display on the wireless device comprises formatting the data according to a form factor of a display of the wireless device.

19. The computer-readable medium of claim 15, wherein the portion of the file that is requested is selected by the user of the wireless device such that only user-specified data selections are pulled from the computing device to the wireless device.

20. The computer-readable medium of claim 15, wherein the communications link comprises the Internet.

21. The computer-readable medium of claim 15, wherein the wireless device is configured to format the extracted data for display.

* * * * *